Dec. 26, 1939.  S. E. BOUCHARD  2,184,409
GOGGLES
Filed Dec. 15, 1938
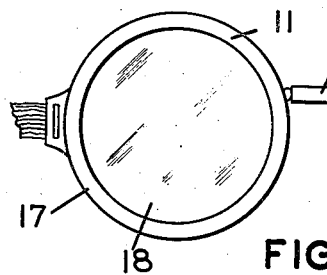
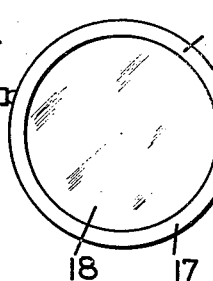
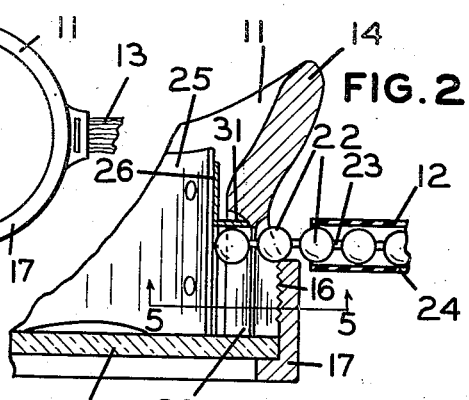
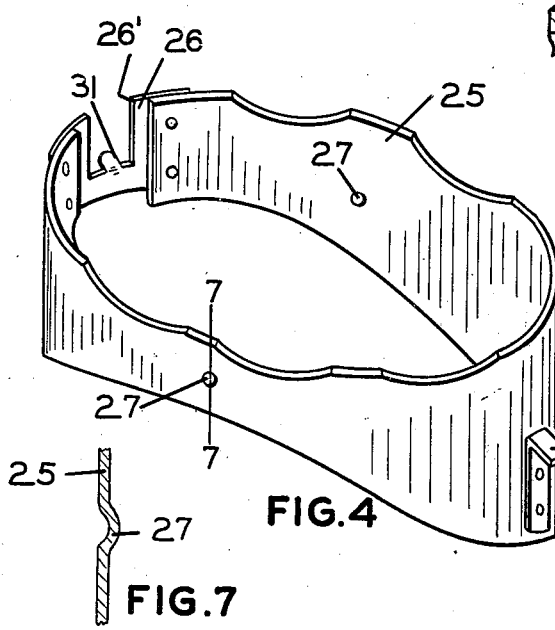
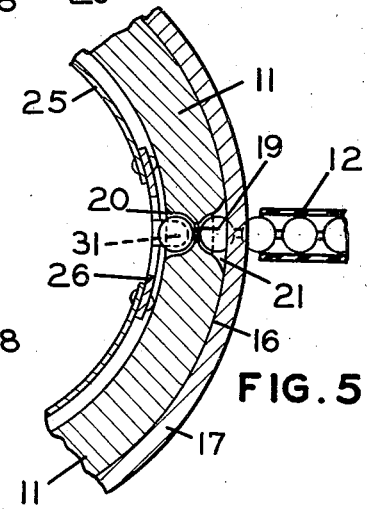
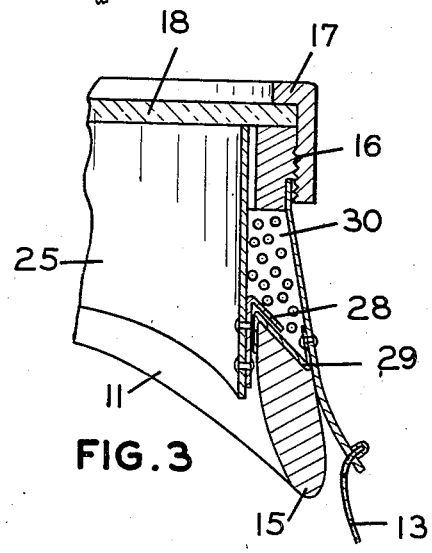
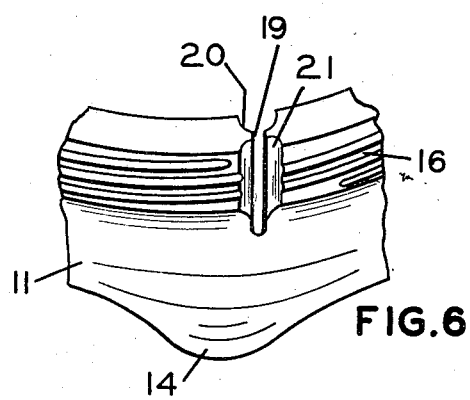
SAMUEL E. BOUCHARD
INVENTOR
BY *J. A. Follestad*
ATTORNEY Patented Dec. 26, 1939

2,184,409

UNITED STATES PATENT OFFICE 2,184,409

GOGGLE

Samuel E. Bouchard, Rochester, N. Y., assignor to Bausch & Lomb Optical Company, Rochester, N. Y., a corporation of New York Application December 15, 1938, Serial No. 245,933

2 Claims. (Cl. 2—14)

This invention relates to goggles and has for one of its objects the provision of a shield which is removably positioned within the eyecup. Another object is to provide a goggle having means for retaining a shield within the eyecup which will be relatively simple in structure yet efficient in operation. These and other objects and advantages reside in certain novel features of construction, arrangement and combination of parts as will hereinafter be more fully described and pointed out in the appended claims.

Referring to the drawing:

Fig. 1 shows a front view of a pair of goggles embodying my invention.

Fig. 2 is an enlarged fragmentary view in section showing the bridge connection with the eyecup.

Fig. 3 is an enlarged fragmentary view in section showing the temporal side of the eyecup.

Fig. 4 is a perspective view of the shield.

Fig. 5 is a view taken on line 5—5 of Fig. 2.

Fig. 6 is a perspective view of a portion of the eyecup showing the bridge slot.

Fig. 7 is a view taken on 7—7 of Fig. 4.

A preferred embodiment of my invention is shown in the drawing wherein 10 indicates, generally, a pair of goggles having two similar eyecups 11 connected by a bridge 12 and adapted to be held on the wearer by the usual headband 13. Each eyecup 11 is made of some suitable material such as molded plastic, for example, and has a substantially cylindrical shape with flared-out portions 14 and 15 adapted to fit, respectively, the nasal and temporal portions of the face of the wearer. The outer end of eyecup 11, remote from the face of the wearer, is threaded, as at 16, to receive the threaded bezel 17 which removably holds the lens 18 in position.

The nasal wall of each eyecup 11 has a slot 19 extending inwardly from the front edge of the eyecup, as shown in Fig. 6. The recessed portions 20 and 21 intersect the slot 19 and extend substantially coextensively therewith on the inner and outer sides of the wall, respectively. The connecting bridge member is of the well-known flexible bead chain type having spaced beads or enlargements 22 connected by narrow portions 23 and with a rubber tubing 24 covering same. With the lens and bezel removed, it will be apparent that the bridge length may be adjusted by removing and inserting the narrow part of the chain in slot 19. The enlargements 22 fit into the recesses 20 and 21 while the narrow portion 23, between a pair of adjacent enlargements, is positioned in the slot 19.

The shield 25 is made of a strip of sheet material which is formed up in a cylindrical shape and has its two ends connected by a member 26 having a cut-out portion 26' to accommodate the bridge. The sheet material used for the shield may be paper, fiber, Celluloid, cellulosic sheeting or the like and may be either opaque or transparent according to the needs of the user. The shield 25 is adapted to fit inside of the eyecup 11 and the diameter of the shield is less than the inside diameter of the eyecup so that the shield is spaced from the inner wall of the eyecup. Outwardly extending projections 27 may be formed in the shield 25 for the purpose of insuring a proper spacing between the shield and the inner wall of the eyecup, for a purpose to be hereinafter described.

The shield 25 is held in position by an outwardly extending finger or projection 28 which is secured to the temporal side of the shield. The projection 28 extends over the wall of an opening 29 formed in the temporal side of the eyecup 11. The opening 29 is covered by a perforated plate or screen 30 in order to permit ventilation of the eyecup 11. The nasal side of the shield 25 is held in place by an outwardly extending finger or projection 31, which may be formed integrally with the connecting member 26, and which extends into the bottom of recess 20 adjacent the slot 19 with the enlargements resting on the top of projection 31.

It will thus be apparent that the shield 25 will be held within the eyecup 11 but may be removed readily by first removing the bezel 17 and taking the bridge member out of the slot 19. This will permit the projection 31 to slide up along the recess 20 so that the shield 25 can be removed. The front edge of shield 25 is cut away as at 32 in order to permit air to pass through the perforated screen 30, into the space between the shield and the inner wall of the eyecup and across the face of the lens so as to provide proper ventilation. For certain types of work the shield 25 may be formed of transparent material and for other types of work, such as arc welding, the shield 25 is made of opaque material.

From the foregoing, it will be apparent that I am able to attain the objects of my invention and provide a goggle having an internal shield which is removably held within the goggle eyecup. Various modifications can obviously be made without departing from the spirit of my invention.

I claim:

1. In a goggle, the combination of an eyecup, said cup having a recess in the inner side of the nasal wall, said cup having an opening in its temporal wall, a substantially cylindrical shield positioned within said cup in coaxial relation therewith and means for holding said shield in position, said means including a projection extending laterally from said shield and into engagement with said recess and a projection extending from the temporal side of said shield and engaging the edge of said opening.

2. In a goggle, the combination of an eyecup having in its nasal wall a slot which extends from the front edge of said cup, the inner side of said wall having a recess which intersects said slot and is coextensive therewith, a bridge member having spaced enlargements connected by narrow portions which are selectively positioned in said slot, a shield extending around the inner side of said eyecup and spaced therefrom, means for holding said shield in position comprising a projection secured to the nasal side of said shield, said projection being positioned in said recess and a second projection engaging a portion of said eyecup on the temporal side of said shield.

SAMUEL E. BOUCHARD.